US006754715B1

(12) United States Patent
Cannon et al.

(10) Patent No.: US 6,754,715 B1
(45) Date of Patent: *Jun. 22, 2004

(54) METHODS AND APPARATUS FOR IMPLEMENTING CONTROL FUNCTIONS IN A STREAMED VIDEO DISPLAY SYSTEM

(75) Inventors: Anthony Cannon, Mountain View, CA (US); David del Val, Mountain View, CA (US); Anders Klemets, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/435,947

(22) Filed: Nov. 9, 1999

Related U.S. Application Data

(63) Continuation of application No. 08/819,586, filed on Mar. 14, 1997, now Pat. No. 6,014,706.
(60) Provisional application No. 60/036,662, filed on Jan. 30, 1997, and provisional application No. 60/036,661, filed on Jan. 30, 1997.

(51) Int. Cl.[7] .......................... G06F 15/16; H04N 7/173
(52) U.S. Cl. ....................................... 709/231; 725/86
(58) Field of Search ..................... 725/93, 88; 709/219, 709/202, 231; 345/501, 547; 375/240; 710/35; 348/719

(56) References Cited

U.S. PATENT DOCUMENTS

| | | | |
|---|---|---|---|
| 4,800,431 A | * 1/1989 | Deering ...................... 348/719 |
| 4,931,950 A | 6/1990 | Isle et al. ................... 364/513 |
| 5,050,161 A | 9/1991 | Golestani ..................... 370/60 |
| 5,119,474 A | 6/1992 | Beitel et al. ................ 395/154 |
| 5,274,758 A | 12/1993 | Beitel et al. ................ 395/154 |
| 5,313,454 A | 5/1994 | Bustini et al. ................ 370/13 |
| 5,341,474 A | 8/1994 | Gelman et al. ............. 395/200 |
| 5,414,455 A | 5/1995 | Hooper et al. ................. 348/7 |

(List continued on next page.)

FOREIGN PATENT DOCUMENTS

| | | |
|---|---|---|
| EP | 0605115 A2 | 7/1994 |
| EP | 0653884 A1 | 5/1995 |
| EP | 0676898 A1 | 10/1995 |
| EP | 0746158 A2 | 12/1996 |
| JP | 202933 | 8/1995 |

OTHER PUBLICATIONS

H.J. Chen et al., "A Scalable Video–on–Demand Service for the Provision of VCR–Like Functions," *IEEE Proceedings of the International Conference on Multimedia Computing and Systems*, Washington, DC, 65–72, (May 15–18, 1995).

*Primary Examiner*—John Follansbee
*Assistant Examiner*—Dustin Nguyen
(74) *Attorney, Agent, or Firm*—Lee & Hayes, PLLC

(57) ABSTRACT

A method for displaying streamed digital video data on a client computer. The client computer is configured to receive the streamed digital video data from a server computer via a computer network. The streamed digital video data is transmitted from the server computer to the client computer as a stream of video frames. The method includes receiving a first plurality of video frames at the client computer. The plurality of video frames represents a subset of the stream of video frames. The stream of video frames comprises independent playable video frames and dependent playable video frames. The method further includes displaying the first plurality of video frames on a video display terminal associated with the client computer. There is further included issuing a rewind command from the client computer to the server. The rewind command causes a second plurality of video frames of the stream of video frames different from the first plurality of video frames to be streamed from the server computer to the client computer. The second plurality of video frames has been streamed at least once to the client computer.

48 Claims, 8 Drawing Sheets

U.S. PATENT DOCUMENTS

| | | | | |
|---|---|---|---|---|
| 5,434,848 A | | 7/1995 | Chimento, Jr. et al. | 370/17 |
| 5,455,910 A | | 10/1995 | Johnson et al. | 395/650 |
| 5,481,542 A | | 1/1996 | Logston et al. | 370/94.2 |
| 5,490,252 A | | 2/1996 | Macera et al. | 395/200.01 |
| 5,504,744 A | | 4/1996 | Adams et al. | 370/60.1 |
| 5,519,701 A | | 5/1996 | Colmant et al. | 370/60.1 |
| 5,521,630 A | | 5/1996 | Chen et al. | 348/7 |
| 5,526,024 A | * | 6/1996 | Gaglianello et al. | 345/547 |
| 5,533,021 A | | 7/1996 | Branstad et al. | 370/60.1 |
| 5,537,408 A | | 7/1996 | Branstad et al. | 370/79 |
| 5,566,175 A | | 10/1996 | Davis | 370/84 |
| 5,574,724 A | | 11/1996 | Bales et al. | 370/68.1 |
| 5,583,561 A | * | 12/1996 | Baker et al. | 725/93 |
| 5,602,956 A | | 2/1997 | Suzuki et al. | |
| 5,603,058 A | * | 2/1997 | Belknap et al. | 710/35 |
| 5,623,690 A | | 4/1997 | Palmer et al. | 395/806 |
| 5,625,405 A | | 4/1997 | DuLac et al. | 348/7 |
| 5,717,691 A | | 2/1998 | Dighe et al. | 370/401 |
| 5,719,786 A | | 2/1998 | Nelson et al. | 364/514 A |
| 5,742,347 A | | 4/1998 | Kandlur et al. | 348/426 |
| 5,768,533 A | | 6/1998 | Ran | 395/200.77 |
| 5,805,173 A | * | 9/1998 | Glennon et al. | 345/501 |
| 5,828,848 A | | 10/1998 | MacCormack et al. | 395/200.77 |
| 5,864,682 A | | 1/1999 | Porter et al. | |
| 5,892,915 A | * | 4/1999 | Duso et al. | 709/219 |
| 6,014,706 A | * | 1/2000 | Cannon et al. | 709/231 |
| 6,445,738 B1 | * | 9/2002 | Zdepski et al. | 375/240 |

\* cited by examiner

METHODS AND APPARATUS FOR IMPLEMENTING CONTROL FUNCTIONS IN A STREAMED VIDEO DISPLAY SYSTEM

CROSS REFERENCE TO RELATED APPLICATIONS

This application is a continuation of U.S. patent application Ser. No. 08/819,586, now U.S. Patent No. 6,014,706 filed on Mar. 14, 1997, which claims the benefit of provisional Application No. 60/036,662 and provisional Application No. 60/036,661, both of which were filed Jan. 30, 1997.

This application is related to U.S. patent application Ser. No. 08/818,805 now abandoned, entitled "Method and Apparatus for Implementing Motion Detection in Video Compression," filed on Mar. 14, 1997, U.S. Pat. No. 6,118,817, entitled "Digital Video Signal Encoder and Encoding Method," issued Sep. 12, 2000, U.S. Pat. No. 6,006,241, entitled "Production of a Video Stream with Synchronized Annotations over a Computer Network," issued Dec. 21, 1999, U.S. Pat. No. 5,999,979, entitled "Methods and Apparatus for Automatically Determining a Most Advantageous Protocols for Use in a Computer Network," issued Dec. 7, 1999, U.S. Pat. No. 6,292,834, entitled "Dynamic Bandwidth Selection for Efficient Transmission of Multimedia Streams in a Computer Network," issued-Sep. 18, 2001, U.S. Pat. No. 6,173 317, entitled "Streaming and Displaying of a Video Stream with Synchronized Annotations over a Computer Network," issued Jan. 9, 2001, U.S. Pat. No. 5,918,002, entitled "Selective Retransmission for Efficient and Reliable Streaming of Multimedia Packets in a Computer Network," issued Jun. 29, 1999, U.S. patent application Ser. No. 08/819,579, entitled "Method and Apparatus for Table-Based Compression with Embedded Coding," filed on Mar. 14, 1997 now abandoned, U.S. patent application Ser. No. 08/819,587, entitled "Method and Apparatus for Implementing Motion Estimation in Video Compression," filed on Mar. 14, 1997 now U.S. Pat. No. 6,584,226, U.S. Pat. No. 6,128,653, entitled "Method and Apparatus for Communication Media Commands and Data Using the HTTP Protocol," issued Oct. 3, 2000, U.S. Pat. No. 5,903,673, entitled "Digital video signal encoder and encoding method," issued May 11, 1999, U.S. Pat. No. 6,215,910, issued Apr. 10 2001, U.S. Pat. No. 6,404,923, entitled "Table-based low-level image classification and compression system," filed Mar. 29, 1996 issued Jun. 11, 2002, and U.S. patent application Ser. No. 08/714,447, entitled "Multimedia Compression System with Additive Temporal Layers," filed Sep. 16, 1996, which are all incorporated herein by reference in their entirety for all purposes.

BACKGROUND OF THE INVENTION

The present invention relates to improved techniques for displaying video images transmitted over a computer network. More particularly, the present invention relates to improved methods and apparatus for implementing control features, such as play, rewind, fast forward, pause, stop, record, and the like, on a real-time video stream and/or live video stream delivered via a computer network from server computers to client computers.

It is well known that digital video data may be manipulated and rendered using computers. In a computer network, e.g., a client-server computer network, one or more computers may be employed to receive the analog video data (e.g., from a video camera), encode that analog video data to a suitable digital format, and store the digital video data file. Using a computer coupled to the network, a user may, at a subsequent time, request the pre-stored digital video data file for display on a video display associated with the client computer.

As computers become more pervasive in the workplace and in the home, the demand for digital video services correspondingly increases. By way of example, it has been recognized that it is possible to employ networked computers as a mass communication medium whereby a pre-stored digital video file may be transmitted from a server to one or more client computers to permit the client computers to display the images after the file is received. This technology may be employed to, for example, deliver movie or training video clips from a central server to one or more client computers for display.

In the above example, it is typically necessary for the client computer to receive the entire pre-stored digital video file prior to rendering the images. Real-time video streaming, on the other hand, refers to the situation wherein the client computer renders the images while they are streamed from the server computer. In some applications, real-time video streaming is favored since it permits the user to begin viewing video frames shortly after requesting the video file instead of having to wait until the entire pre-stored file is downloaded from the server computer.

It has been found, however, that real-time video streaming is difficult to implement on heterogeneous, lossy networks such as corporate intranets or the Internet, i.e., the well-known international computer network that links, among others, various military, governmental, educational, nonprofit, industrial and financial institutions, commercial enterprises, and individuals. This is because real-time digital video applications, as are all digital video applications, are resource-intensive to implement. Even with compression, the transmission of quality video clips (i.e., those with acceptable frame rate and frame quality) places a heavy bandwidth burden on the computer network. For that reason, real-time video streaming has traditionally been implemented on proprietary and expensive networks that are capable of supporting a high bit rate (e.g., private high-speed local area networks (LAN) or dedicated data links).

Furthermore, real-time video data is time-sensitive, i.e., the data packets containing the real-time video data must be received in a timely manner in the proper sequence for acceptable display. In bandwidth limited networks, e.g., corporate intranets which support a high number of users or heterogeneous, lossy public networks such as the aforementioned. Internet, the time-sensitive nature of real-time digital video data poses special challenges. There is, for example, less time to retransmit a lost data packet because if the time for displaying a given data packet at the client computer has passed, there is little use for that data packet if and when it arrives.

It has also been found that real-time digital video streaming poses complex frame synchronization issues. Since the video frames to be displayed are not stored with the client computer, there is no pre-stored file on which to perform control features such as rewind, fast forward, play, and pause. Typically, the video frames necessary for performing these functions are requested from the server computer itself. Responsive to the control commands, the video frames necessary for performing the requested control feature are then streamed to the client computer, typically over the same data connection to minimize the latency associated with opening another data connection. As can be appreciated by those skilled, complications can arise while switching among different groups of video frames, some of which may be waiting to be sent at the server, waiting to be displayed at the client, in transit through the network, or lost.

The complexity involved in implementing control features on real-time video stream is further compounded by the requirement of low latency, which is imposed by real-time video applications, i.e., the requirement that any delay between the time a given video frame is transmitted from the server computer and the moment it is rendered at the client computer be minimized. Unless these control features are properly implemented, undue latency may occur and/or the quality of the viewing experience may degrade.

All the challenges discussed above also apply to live video streaming. In live video streaming, the video data may be digitized in one location, then encoded and transmitted to a client computer (via a server) substantially instantaneously (with some delay due to the encoding and transmission of video frames) for display. Live video and real-time video may be thought of as subsets of streamed video since both live video frames and real-time video frames are rendered as they are streamed from the server. Live video rendering, however, results in the display of most recently encoded video frames whereas real-time video rendering may result in displaying past video frames of a currently recorded event or even an event that happened and was recorded a long time ago. As can be appreciated, live video streaming applications are even more sensitive with respect to the data packets transmitted via the network. This is because the live event being record continues to unfold, and video frames related thereto continue to be formed and require to be displayed as time goes by.

Frame synchronization issues pertaining to live video streaming are further complicated by the fact that the digital video data file at the server is being formed at the same time the video frames pertaining thereto are displayed at the client computer. This is because copies of video frames sent to the client computer are also stored in the server in a digital video data file for subsequent use. Accordingly, there are complexities involved when, for example, the user wishes to switch from a live video viewing mode to a rewind mode, view past video frames for a few seconds, and fast forward to the end of the still growing digital video data file to again play live video frames. Because of the complexities involved, as well as the bandwidth and latency requirements, prior art attempts at implementing control features on live video streams have largely been unsatisfactory. While this is true for most networks, it is particularly true for the Internet wherein the transport network is typically lossy and outside the control of the owner of the server and/or the client computer, and wherein the bandwidth available is both limited and subject to fluctuations.

In view of the foregoing, there are desired improved methods and apparatus for implementing control features on real-time video streams and/or live video streams transmitted via a computer network from server computer(s) to client computer(s).

SUMMARY OF THE INVENTION

The invention relates, in one embodiment, to a method for transmitting streamed digital video data from a server. The server is configured for coupling to a client computer via a computer network. The method includes inputting a first plurality of data packets into a server play-out buffer of the server. The first plurality of the data packets contains video frames representing the streamed digital video data. An output of the server play-out buffer is configured to be coupled to a network data connection for transmitting the first plurality of the data packets to the client computer.

The method includes receiving, using a retransmission buffer, the first plurality of the data packets from the server play-out buffer. An output of the retransmission buffer is coupled to the network data connection. The method further includes outputting the first plurality of the data packets from the server play-out buffer onto the network data connection for transmitting the data packets to the client computer via the computer network.

In another embodiment, the invention relates to a method for displaying streamed digital video data on a client computer. The client computer is configured to receive the streamed digital video data from a server computer via a computer network. The streamed digital video data is transmitted from the server computer to the client computer as a stream of video frames. The method includes receiving a first plurality of video frames at the client computer. The plurality of video frames represents a subset of the stream of video frames. The stream of video frames comprises independent playable video frames and dependent playable video frames.

The method further includes displaying the first plurality of video frames on a video display terminal associated with the client computer. There is further included issuing a rewind command from the client computer to the server. The rewind command causes a second plurality of video frames of the stream of video frames different from the first plurality of video frames to be streamed from the server computer to the client computer. The second plurality of video frames has been streamed at least once to the client computer.

In yet another embodiment, the invention relates to a computer readable medium containing computer-readable instructions for implementing control features configured for controlling a display of streamed digital video data at a client computer as the client computer transitions from a first control mode to a second control mode. The client computer is configured for coupling to a server computer via a computer network. The streamed digital video data is transmitted from the server computer to the client computer as a stream of video frames comprising independent video frames and dependent video frames. The stream of video frames is encapsulated in a plurality of data packets each having a unique packet sequence number and a unique timestamp. The computer readable instructions include computer readable instructions for sending a control command and a time parameter from the client computer to the server computer. The control command represents a command to the server to transmit a first plurality of video frames of the stream of video frames to the client computer in accordance with the second control mode.

The computer readable instructions also include computer readable instructions for ascertaining, responsive to the control command and using the server computer, a first independent video frame to transmit to the client computer. The first independent video frame is selected responsive to the time parameter. The computer readable instructions further include computer readable instructions for transmitting from the server computer to the client computer a packet sequence number associated with the first independent video frame. The computer readable instructions further include computer readable instructions for streaming the first plurality of video frames of the stream of video frames starting from the first independent video frame from the server computer to the client computer to permit the first plurality of video frames to be displayed at the client computer.

These and other features of the present invention will be described in more detail below in the detailed description of the invention and in conjunction with the following figures.

DETAILED DESCRIPTION OF THE PREFERRED EMBODIMENTS

Figure 1A:
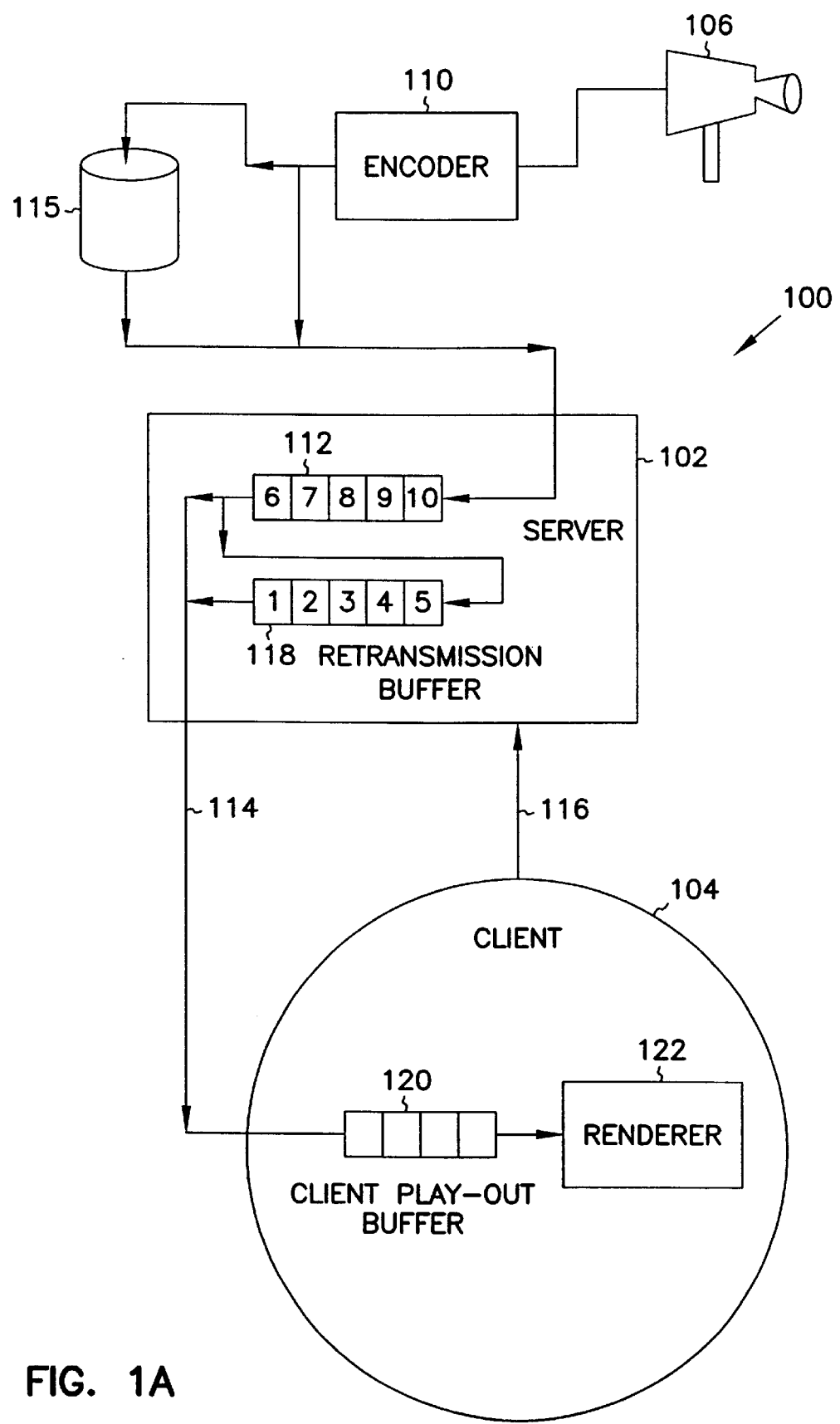
FIG. 1A depicts in accordance with one embodiment of the present invention a computer network 1 suitable for implementing the inventive streamed video display technique.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order to not unnecessarily obscure the present invention.

In accordance with one aspect of the present invention, there are provided improved techniques for streaming real-time video data from the server computer to the client computer for display. In accordance with this aspect of the present invention, digital data pertaining to the real-time video stream is transmitted from the server computer to the client computer as data packets in either one of two streams: a play stream and a fast forward stream. As will be explored in great details herein, the use of a separate fast forward stream of video frames advantageously permits the fast forward feature to be implemented with lower bandwidth requirements and improved display quality. As the user switches from the play mode to the fast forward mode and vice versa, data packets containing video data in either the play stream or the fast forward stream are transmitted from the server computer to the client computer for display.

The play stream includes frames which, when played at the designated frame rate by the renderer application in the client computer (about 10 frames per second in one example), maximizes quality while minimizing the bandwidth requirement. This normal play mode represents the mode that the user normally employs to view the video frames (e.g., watching a movie or a video clip). It should be understood that normal play is typically accompanied by sound (typically furnished to the client via a data connection different from the one used to transmit video), and perhaps other applets. The fast forward stream includes frames which, when played at the designated frame rate by the renderer application in the client computer, provides the user with a fast forward effect while advantageously keeping the display quality higher and the bit rate lower than would have been possible had the play stream been employed for fast forwarding. This aspect of the invention is discussed in detail later herein. By way of example, the fast forward stream may be played at 5 frames per second, which displays frame at five times the play speed.

In accordance with another aspect of the present invention, the data packets traverse at least two buffers prior to arriving at the render application in the client computer for display: a retransmit buffer at the server computer and a client play-out buffer at the client computer. In one embodiment, a server play-out buffer is provided at the server as well to facilitate efficient data packet transmission. The use of the client play-out buffer and/or the server play-out buffer advantageously maintain(s) small supply of data packets available at the client ready for display, thereby minimizing impacts on the viewing experience due to temporary fluctuations in the network's available bandwidth and the temporary disruptions to the transmission of data packets through the computer network, e.g., due to temporary network congestion.

In accordance with yet another aspect of the present invention, there are provided novel and efficient implementations of control features, such as play, rewind, fast forward, pause, stop, record, and/or the like. In one embodiment, the control features are implemented to maximize the user's familiarity with common video cassette recorder (VCR) control features. Using the control features of the present invention, the user is able to control, in a user-friendly and intuitive manner, the transmission and display of the video frames pertaining to a real-time video stream or, advantageously, even a live video stream at the client computer. This aspect of the invention is particularly advantageous since the user may, using the inventive technique, flexibly control the display of streamed real-time video frames without being unduly constrained by the real-time nature of the data or the inherent time-sensitive nature of the transmitted real-time data packets. In one embodiment, the transition between the different control modes, e.g., from play to fast forward, from rewind to play, and the like, are made efficient and synchronized, thereby maximizing the display quality of video frames.

To further facilitate discussion of the foregoing, FIG. 1A depicts in accordance with one embodiment of the present invention a computer network 100, representing a computer network suitable for implementing the inventive real-time video display technique. Computer network 100 may, for example, represent a portion of the aforementioned Internet or corporate intranet.

In FIG. 1A, computer network 100 includes a server computer 102 and a client computer 104. There is also shown a video camera 106. In the present example, video camera 106 represents the device for recording video data. The recorded video data may then be digitized and encoded by encoder 110 into the proper digital data format for transmission to either server 102 or memory 115 for storage. Encoder 110 represents, in one embodiment of the invention, the video source from which data may be streamed to the client via the server. Encoder 110, which may be implemented in hardware or software, may also perform compression on the raw digital video data to improve storage and transmission efficiency. One suitable encoding scheme is disclosed in a commonly assigned co-pending patent U.S. patent application Ser. No. 08/623,299, filed Mar. 28, 1996, incorporated herein by reference for all purposes.

Data packets outputted by encoder 110 (or retrieved from memory 115) are then buffered within server play-out buffer 112 for transmission to client computer 104. Although memory 115 is depicted as nonvolatile disk memory in FIG. 1A, it may represent any suitable type of memory device, including volatile semiconductor memory. As will be discussed earlier, the file of data packets stored within memory 115 may be employed by client computer 104 to facilitate rewind, fast forward, and other control modes.

As each data packet or group of data packets is outputted from server play-out buffer 112 onto data connection 114 for transmission (e.g., responsive to a command from client computer 104 which is received by server computer 102 via a control connection 116), the same data packet or group of data packets is input into retransmit buffer 118 at the server. Control connection 116 and data connection 114 have been discussed in detail in a commonly assigned co-pending U.S. patent application Ser. No. 08/829,586 now U.S. Pat. No. 6,014,706, entitled "Methods and Apparatus for Implementing Control Functions in a Streamed Video Display System."

Retransmit buffer 118 represents in one embodiment a first-in-first-out (FIFO) buffer which retains for a limited time a data packet transmitted from server play-out buffer 112. As new data packets are input into retransmit buffer 118, old data packets (starting with the oldest data packets) are discarded from transmit buffer 118. The use of the retransmit buffer advantageously facilitates the rapid retransmission of a data packet therein if that data packet is requested by client computer 104 for retransmission (e.g., in the event a data packet is detected to be missing by client computer 104). Retransmit buffer 118 is preferably sized such that a data packet stays in retransmit buffer 118 slightly longer than the average latency period between the time a data packet is transmitted from server 102 and when it is displayed at client computer 104. There is no need, in one embodiment of the invention, for the retransmit buffer 118 to be much larger than mentioned since, due to the time-sensitive nature of real-time video and/or live video, it is typically not useful to keep a data packet therein long past the time it is required at client computer 104 for display.

As data packets are received by client computer 104 from data connection 114, they are inputted into client play-out buffer 120 to be displayed by renderer application 122. Client play-out buffer 120 may represent, in one embodiment, a FIFO buffer. Client play-out buffer 120 and/or server play-out buffer 112 are typically sized appropriately to minimize latency while taking into account the reliability and stability of network 100 through which data connection 114 traverses. If the network is fairly reliable and its bandwidth is fairly stable, client play-out buffer 120 and/or server play-out buffer 112 may be relatively small to minimize the latency between the time a data packet is outputted by encoder 110 and the time it is displayed at the client computer. On the other hand, a larger client play-out buffer 120 and/or server play-out buffer 112 may be able to more effectively insulate renderer application 122 from temporary bandwidth capacity fluctuations and disruptions in the transmission of data packets from server computer 102.

Client play-out buffer 120 may be, but is not required to be, equal in size to retransmit buffer 118 since retransmission of a data packet from retransmit buffer 118 is typically useful only prior to its turn to be displayed, i.e., prior to the time that data packet is needed at the output of client play-out buffer 120. It should be appreciated that the buffers shown herein may be implemented, in one embodiment, in software and may be dynamically sized as needed. Renderer application 122 may, in this example, include a decoder for decoding the encoded digital data.

Figure 1B:
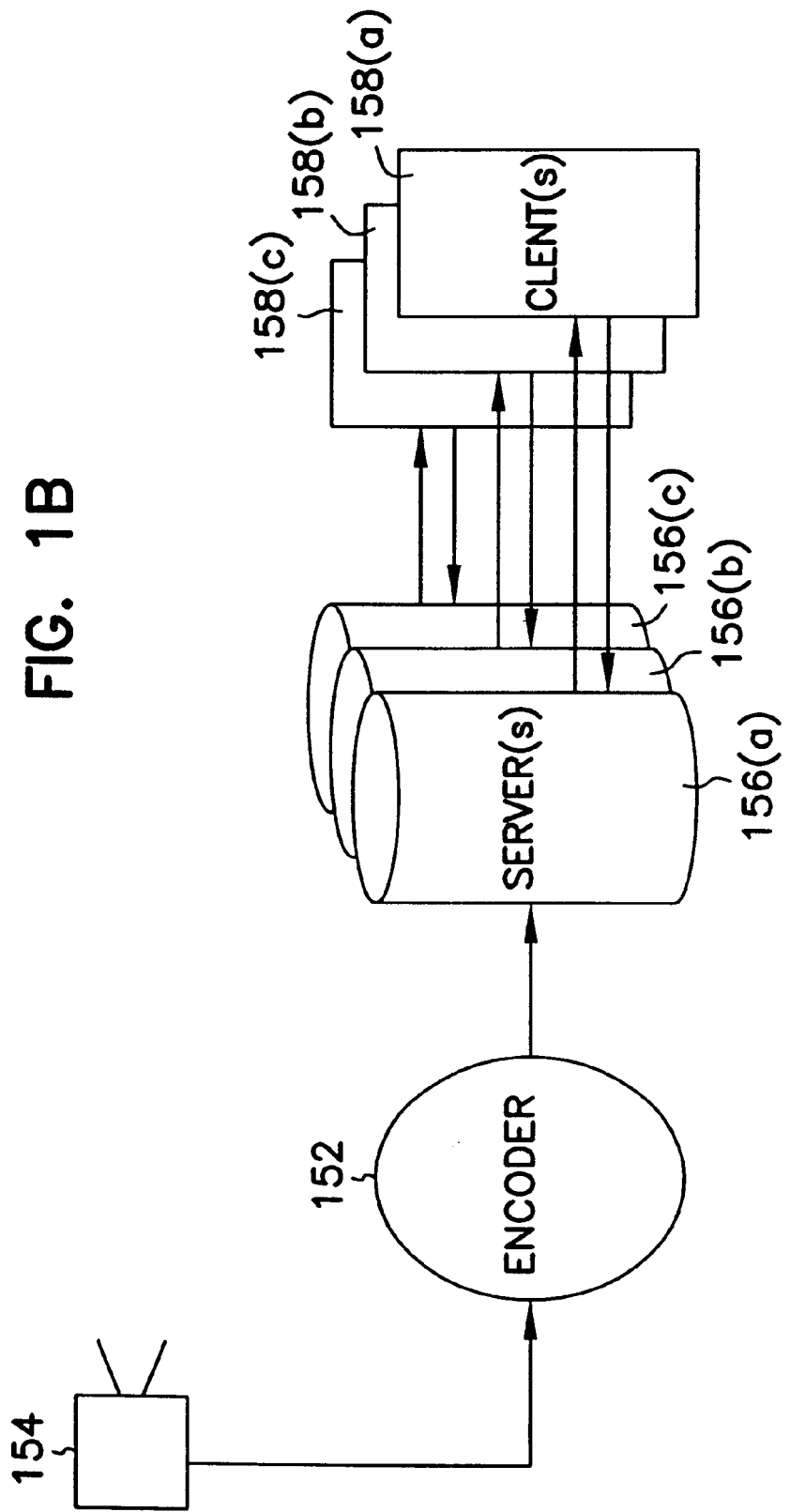
FIG. 1B illustrates an embodiment of the invention wherein an encoder furnishes video data from a video source to multiple servers.

Although only one control connection 116 and one control connection 114 are shown in FIG. 1A to facilitate ease of discussion, a given real-time video session may involve multiple data and control connections for the multiple data streams, e.g., video, audio, annotations, and the like. Further, encoder 110 may be physically implemented on a computer other than server 102. In one embodiment, a single encoder may furnish video data to multiple servers, possibly located at geographically dispersed locations, to permit those servers to service requests from any number of client computers. FIG. 1B illustrates this embodiment wherein encoder 152 furnishes video data from video camera 154 to multiple servers 156. Using a suitable protocol, clients 158 may request video data packets from one or more of servers 156 to display video frames at clients 158.

In one particularly advantageous embodiment, client 158 represents a plug-in software application that plugs into a web browser executing on a client computer. When client application 158 is initiated, it establishes a control connection with one or more servers 156 and requests therefrom the desired video file(s). If the desired video file(s) could be found on server 156, server 156 may be begin streaming video data packets, either from memory 115 or directly from encoder 110, to the requesting client application 158 via a data connection Via the control connection, the user may also issue control commands, e.g., fast forward, rewind, pause, unpause, record, and the like, which alter the order in which video data packets is delivered to client application 158.

Figure 2:
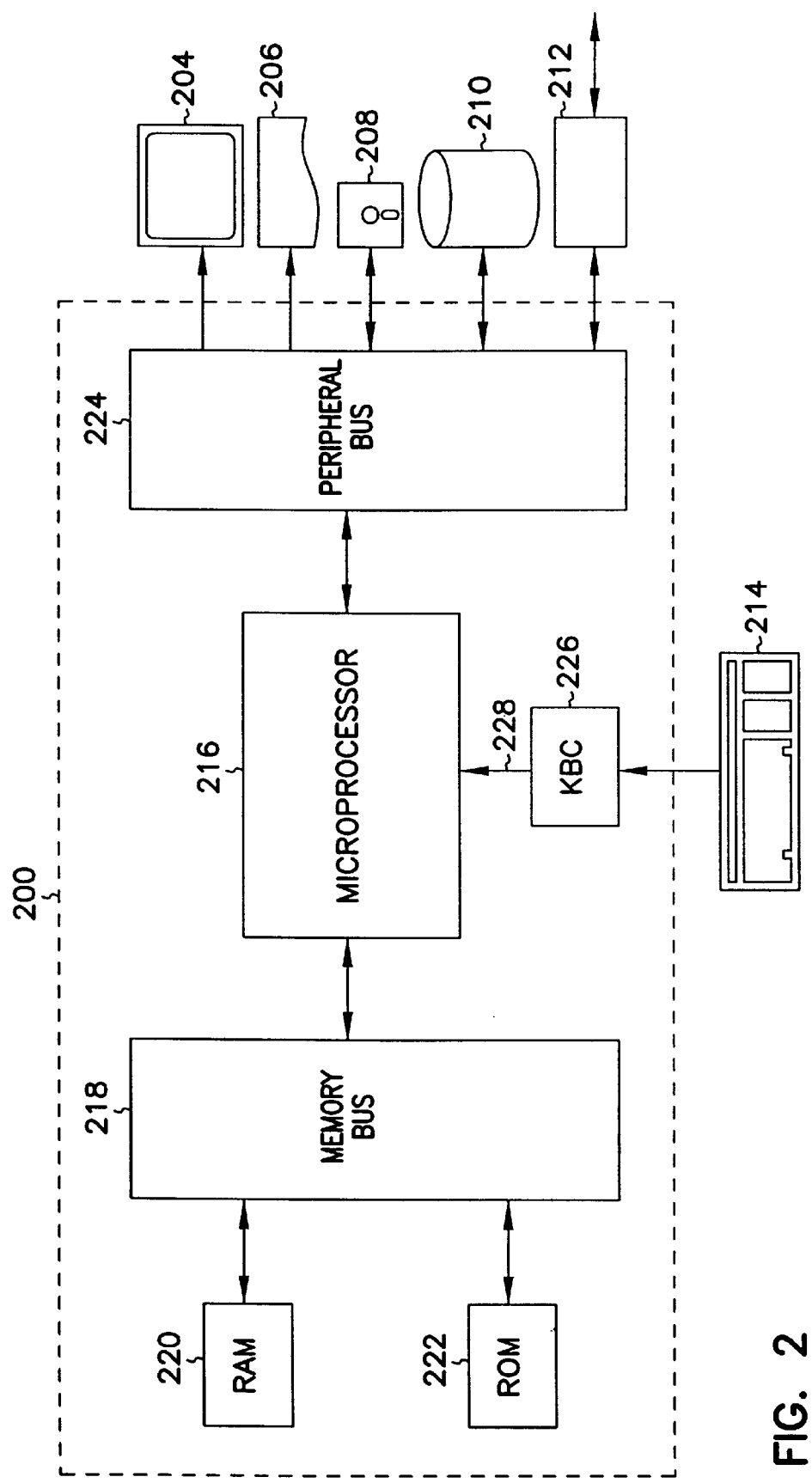
FIG. 2 is a block diagram of an exemplar digital computer, representing a computer suitable for implementing either the server computer or the client computer of the present invention.

The servers and client computers of the present invention may be implemented using any number of well known computers capable of being interconnected via a computer network. In some cases, client computer 104 may represent a special purpose device for displaying data, e.g., a digital television set having therein the decoder and the appropriate renderer software or hardware. FIG. 2 is a block diagram of an exemplar digital computer 202, representing a computer suitable for implementing either server computer 102 or client computer 104 of FIG. 1. Digital computer 202 may include a display screen (or monitor) 204, a printer 206, a floppy disk drive 208, a hard disk drive 210, a network interface 212, and a keyboard 214. The digital computer 202 includes a microprocessor 216, a memory bus 218, random access memory (RAM) 220, read only memory (ROM) 222, a peripheral bus 224, and a keyboard controller 226. The digital computer 202 can be a personal computer (such as an Apple computer, e.g., an Apple Macintosh, an IBM personal computer, or one of the compatibles thereof), a workstation computer (such as a Sun Microsystems or Hewlett-Packard workstation), or some other type of computer.

The microprocessor 216 is a general purpose digital processor which controls the operation of the digital computer 202. The microprocessor 216 can be a single-chip processor or can be implemented with multiple components. Using instructions retrieved from memory, the microprocessor 216 controls the reception and manipulation of input data and the output and display of data on output devices.

The memory bus 218 is used by the microprocessor 216 to access the RAM 220 and the ROM 222. The RAM 220 is used by the microprocessor 216 as a general storage area and as scratch-pad memory, and can also be used to store input data and processed data. The ROM 222 can be used to store instructions or program code followed by the microprocessor 216 as well as other data.

The peripheral bus 224 is used to access the input, output, and storage devices used by the digital computer 202. In the described embodiment, these devices include the display screen 204, the printer device 206, the floppy disk drive 208, the hard disk drive 210, and the network interface 212, which is employed to connect digital computer 202 to the network. The keyboard controller 226 is used to receive input from keyboard 214 and send decoded symbols for each pressed key to microprocessor 216 over bus 228.

The display screen 204 is an output device that displays images of data provided by the microprocessor 216 via the peripheral bus 224 or provided by other components in the digital computer 202. The printer device 206 when operating as a printer provides an image on a sheet of paper or a similar surface. Other output devices such as a plotter, typesetter, etc. can be used in place of, or in addition to, the printer device 206.

The floppy disk drive 208 and the hard disk drive 210 can be used to store various types of data. The floppy disk drive 208 facilitates transporting such data to other computer systems, and hard disk drive 210 permits fast access to large amounts of stored data.

The microprocessor 216 together with an operating system operate to execute computer code and produce and use data. The computer code and data may reside on the RAM 220, the ROM 222, the hard disk drive 220, or even on another computer on the network. The computer code and data could also reside on a removable program medium and loaded or installed onto the digital computer 202 when needed. Removable program mediums include, for example, CD-ROM, PC-CARD, floppy disk and magnetic tape.

The network interface circuit 212 is used to send and receive data over a network connected to other computer systems. An interface card or similar device and appropriate software implemented by the microprocessor 216 can be used to connect the digital computer 202 to an existing network and transfer data according to standard protocols.

The keyboard 214 is used by a user to input commands and other instructions to the digital computer 202. Other types of user input devices can also be used in conjunction with the present invention. For example, pointing devices such as a computer mouse, a track ball, a stylus, or a tablet can be used to manipulate a pointer on a screen of a general-purpose computer.

The invention can also be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices. The computer readable code can also be distributed over a network coupled computer systems so that the computer readable code is stored and executed in a distributed fashion.

Figure 3:
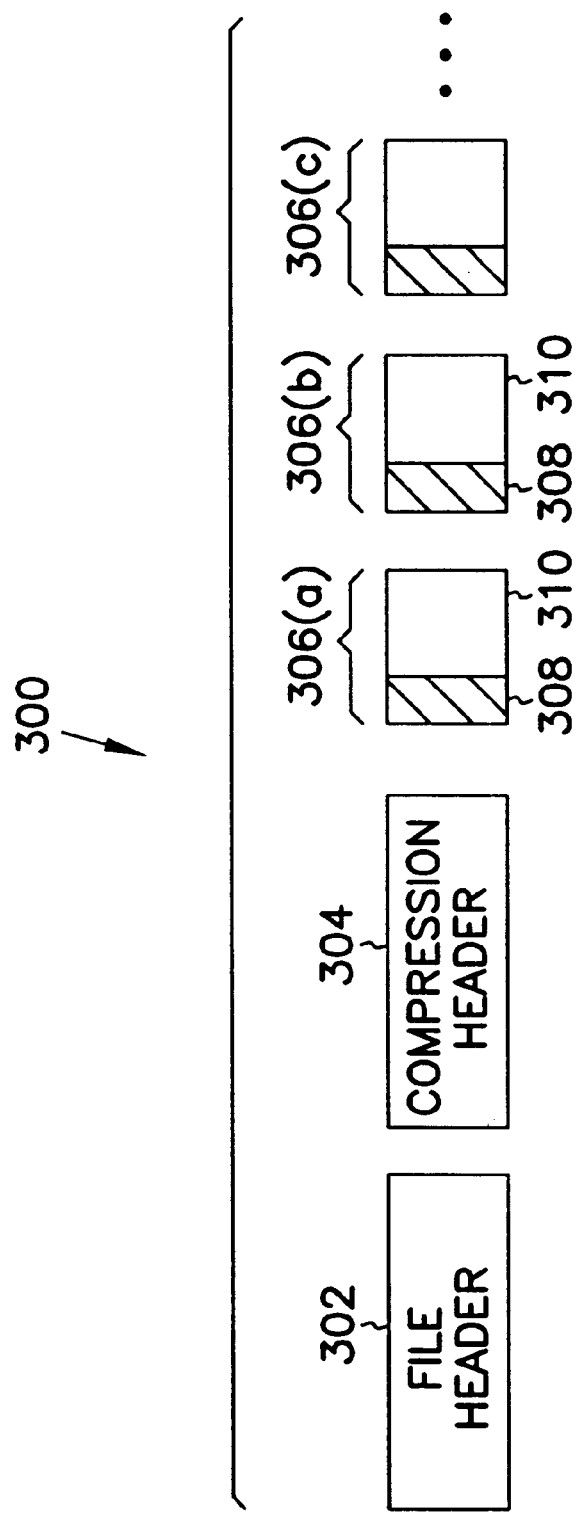
FIG. 3 illustrates, in accordance with one embodiment of the invention, a VXF-formatted file, representing a file suitable for streaming encoded video data from the source, e.g., a video camera, to the server and the client application.

In accordance with one aspect of the present invention, the encoder encodes video data in the VXF format for streaming to the client computers (via servers) FIG. 3 illustrates, in accordance with one embodiment of the invention, a VXF-formatted file, representing a file for streaming encoded video data from the source, e.g., a video camera, to the server and the client application.

In general, a VXF-formatted file 300 includes a file header 302, which may include data such as the length of file 300, the type of compression employed (e.g., HVQ), and other bibliographic information pertaining to the file VXF-formatted file 300 further includes a compression header 304, which may contain data regarding the parameters employed in encoding file 300. The data in compression header 304 may be employed by a decoder at the client computer, for example, in order to decode the data therein.

Actual encoded video data is stored in a plurality of data packets 306. Each of data packets 306 generally includes a packet header 308 and a payload 310. Payload 310 may be employed to transmit any type of data. In the context of the present disclosure, payload 310 is employed to transmit encoded video, audio, or annotation data to the servers and/or the client computers. Packet header may also include data that indicates whether the data packet is associated with the play stream or the fast forward stream. The advantages associated with providing both a play stream and a fast forward stream will be discussed later herein.

In one embodiment, packet header 308 also includes data which indicates whether this data packet is associated with a video frame that is playable, seekable, or fast-forwardable. A video frame that is playable represents a video frame suitable for display while the client application is in either the real-time play mode or the live play mode. A video frame that is seekable permits the server to skip in reverse or forward through groups of frames as the server seeks among the seekable frames. A seekable frame is preferably a frame that is decodable without depending on information from its neighboring frames. A video frame that is fast-forwardable represents a video frame suitable for display while the client application is in the fast forward mode. This aspect of the invention is also discussed in detail later in connection with subsequent FIG. 4.

Packet header 308 may also include a packet number, which is assigned sequentially to each of the data packets. By monitoring the sequence of packet numbers associated with the received data packets, a client application may be able to ascertain whether a given data packet is missing (e.g., due to network problem) and to request retransmission of the missing data packet. Packet header 308 may also include a time stamp, typically representing an offset time value from the beginning of file 300. By reading the time stamp, which is generally assigned by the video recorder and/or the encoder, the client application may be able to ascertain when video data pertaining to a particular data packet should be rendered.

In one embodiment, the digital video data is encoded into a series of independent (I) frames and dependent (P) frames, which have been encoded in accordance with a Hierarchical Vector Quantization encoding technique. An implementation of this technique has been discussed in detail in the commonly assigned, co-pending patent application, U.S. patent application Ser. No. 08/623,299, filed Mar. 28, 1996, which is incorporated herein by reference. In general, an I frame contains all the data necessary for decoding into a video frame without depending on data from any other frame. A P frame, on the other hand, encodes only the difference between the video frame it represents and the most recent I frames. Since P frames only encode the differences, they are generally smaller and therefore more efficient to transmit and store.

Figure 4:
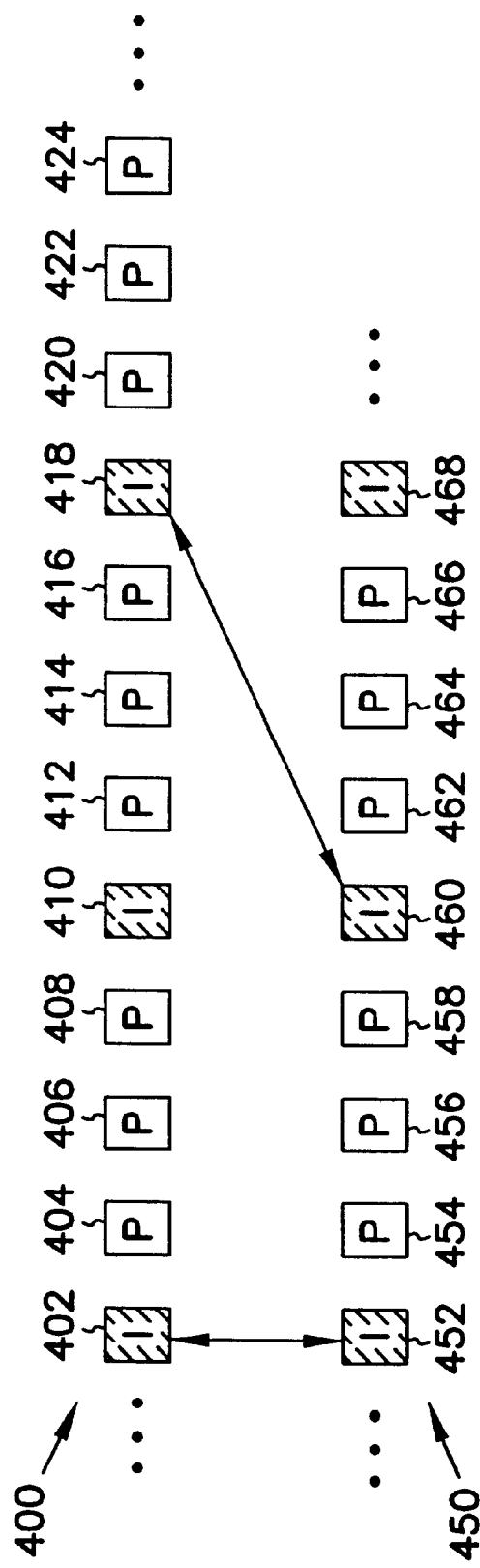
FIG. 4 depicts, in accordance with one embodiment of the invention, two video streams: a play stream and a fast-forward stream to facilitate discussion.

In accordance with one aspect of the present invention, the video data pertaining to a given session is encoded in two separate data streams: a digital play stream and a digital fast forward stream. To facilitate discussion, FIG. 4 depicts, in accordance with one embodiment of the invention, two video streams: a play stream 400 and a fast-forward stream 450. It should be borne in mind that although the streams are depicted by a series of video frames in FIG. 4 for ease of discussion, each frame in practice may be transmitted in a portion of a data packet, or in one or more data packets. Accordingly, the fast-forward streams includes a plurality of underlying data packets representing the fast-forward video frames, and the play stream includes a plurality of underlying data packets representing the playable video frames.

In the play mode, data packets associated with play stream 400 are streamed from the server to the client to be rendered by the renderer application. The client computer looks at the packet header associated with each of packets 402–424 and ascertains whether they are playable. Since they are associated with the play stream, the packet header in each will indicate that each of packets 402–424 is playable. The frame rate rendered may be, for example, 10 frames per second in one embodiment but may vary to suit the requirements and capabilities of a particular system.

As mentioned earlier, there is provided, in accordance with one embodiment of the present invention, a separate fast forward stream. The use of the fast forward stream may advantageously lower the bandwidth requirement while the renderer application is in the fast forward mode while improving the quality of the fast forward video frames. To discuss this aspect of the invention, reference should now be made to fast forward stream 450 and compares this fast forward stream to play stream 400.

The I frames must be transmitted since P frames cannot be decoded at the client computer unless information pertaining the I frames are available to the decoder. In this example, I frames 402, 410, and 418 would be transmitted. Of course I frame 410 may be omitted when fast forwarding as well but this may negatively impact the display quality of the fast forward video, e.g., makes the video clip more jerky, since only two frames (I frames 402 and 418) are available for display at the client computer when fast forwarding through this portion of the video clip.

The fast forwarding visual effect is achieved when some frames are discarded and the remaining frames are rendered in a shorter period of time than it would have taken to render all the corresponding frames in the play stream. In the present example, if P frames 404, 406, 408, 412, 414, and 416 are discarded (i.e., not transmitted from the server computer to the client computer) and I frames 402, 410, and 418 are rendered in a shortened period of time (e.g., ⅗ the time it takes to play frames 402–418 in a play mode), fast forwarding would have been achieved using only the play stream 400.

Compare now to the situation wherein the fast forward stream 450 is employed to achieve the fast forward effect. In FIG. 4, the time stamp of I frame 402 in play stream 400 roughly corresponds to the time stamp of I frame 452 in the fast forward stream 450. Likewise, the time stamp of I frame 418 in play stream 400 roughly corresponds in time to the time stamp of I frame 460 in the fast forward stream 450. Note that the data contained in the other six P frames (404, 406, 408, 412, 414, and 416) and one other I frame (410) of play stream 400 is encoded in three P frames (456, 458, and 460) of fast forward stream 450. When fast forward stream 450 is employed in the fast forward mode, the same portion of the video clip is rendered in 2 I frames (452 and 460) and 3 P frames (454, 456, and 458). As discussed above, this same portion of the video clip would have required three I frames (402, 410, and 418) had play stream 400 been employed for fast forwarding. In most cases, it requires less bandwidth to transmit three P frames (454, 456, and 458) than an additional I frame (410) since P frames, as mentioned, only encode the differences. Accordingly, the use of fast forward stream 450 advantageously reduces the bandwidth requirement while the renderer application is in the fast forward mode.

As an added advantage, the use of fast forward stream 450 permits the same portion of the video clip to be rendered in five frames (452–460) instead of only 3 I frames (402, 410, and 418) as would have been the case had play stream 400 been employed for fast forwarding. As can be appreciated by those skilled, the availability of two additional frames reduces the jerkiness of the rendered video clip, thereby resulting in a smoother fast forward sequence.

In accordance with one particularly advantageous embodiment of the present invention, there are provided two play modes: live play mode and real-time play mode. Live play mode represents the operating mode of the renderer application when the user at the client computer indicates that he would like to view the video frames as they are being streamed from the encoder (via the server). Typically, live play mode displays data packets substantially as the event they represent is recorded (with some minor delay due to encoding and transmission). In the live play mode, it is typically not permissible to fast forward (since the event to be captured by subsequent video frames has yet to occur).

Real-time play mode, on the other hand, represents the operating mode of the renderer application when the user at the client computer indicates that he would like to view video frames that have been stored earlier in the server, i.e., in a digital video file. The digital video file may have been completely formed or partially formed (e.g., the case where the user rewinds to past video frames of a live video stream). Accordingly, it is possible to fast forward while in real-time play mode since subsequent frames may have already been encoded and pre-stored at the server. It should be pointed out again that in a given live video stream, the user may be in real-time play mode when watching events that have been encoded and pre-stored some time ago. If the user fast forward on the same live stream, lie may encounter the end of the pre-stored file (which is still growing as new video frames are captured, encoded, and stored), and may need to switch to a live-play mode to view the more recently recorded and encoded video frames.

Figure 5:
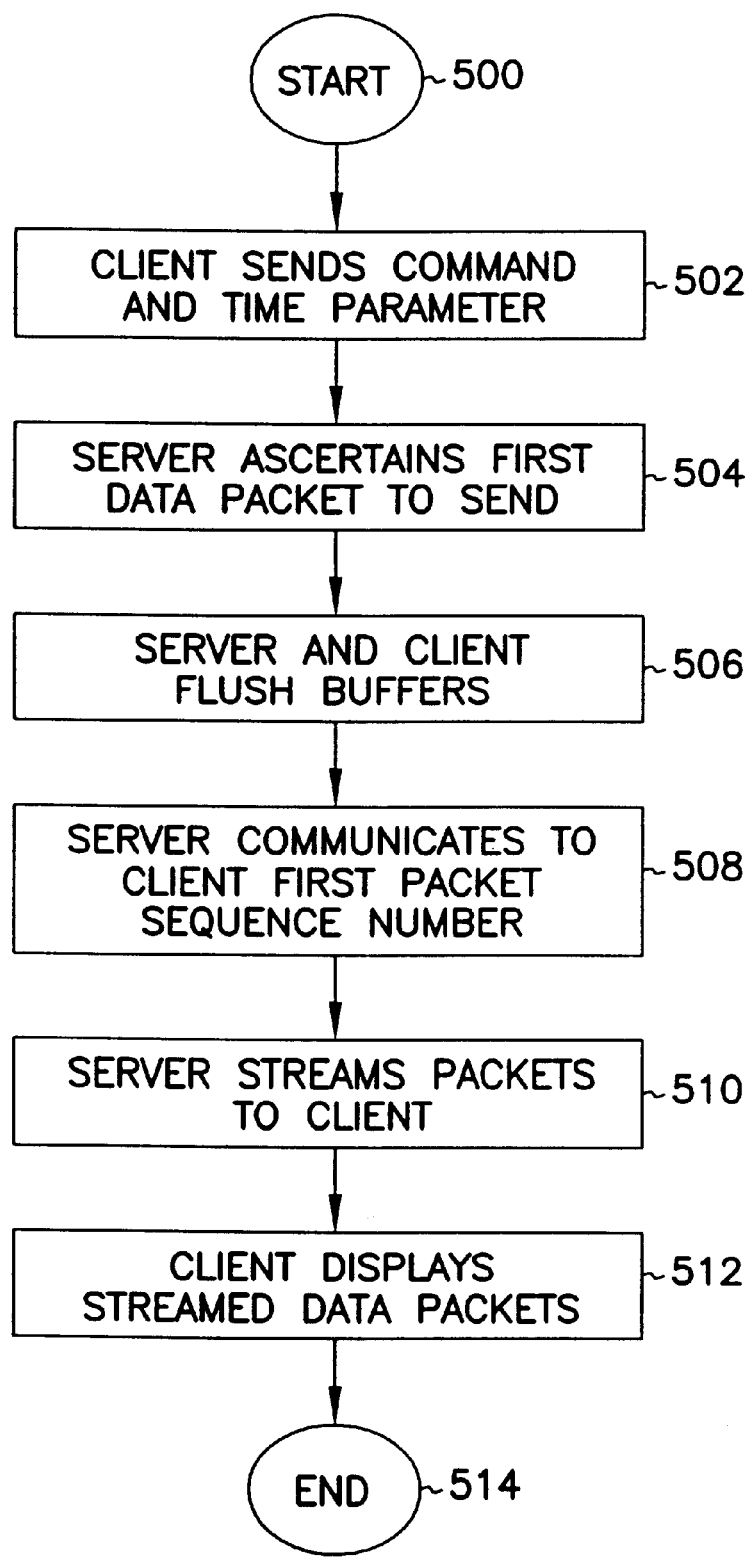
FIG. 5 illustrates, in accordance with one embodiment of the invention, a simplified flowchart illustrating the implementation of certain control features such as play and fast forward.

FIG. 5 illustrates, in accordance with one embodiment of the invention, a simplified flowchart illustrating the implementation of certain control features such as play and fast forward. FIG. 5 is a flow chart for the general case; specific control features are discussed in greater detail with reference to the general flow chart of FIG. 5 and in the drawings and text hereinbelow. In step 502, the client issues a command at the client computer, e.g., by clicking on an appropriate icon or interacting via a dialog box. In the context of the current discussion, this command may represent for example a play command. The play command typically involves the command itself and a time parameter. For example, the user may wish to play in live play mode, in which case the time parameter may simply represent a flag for the server to stream the latest encoded frames to the client computer for display. As a further example, the user may wish to play from time 2 seconds, i.e., 2 seconds from the start of the video file. If the recording session has been longer than 2 seconds (e.g., the currently recorded and encoded video frame has a time stamp of 5 minutes) the command to play from time 2 seconds indicates that video frames pre-stored at the server need to be recalled for rendering, i.e., the render application should operate in the real-time play mode but not the live play mode.

Figure 6:
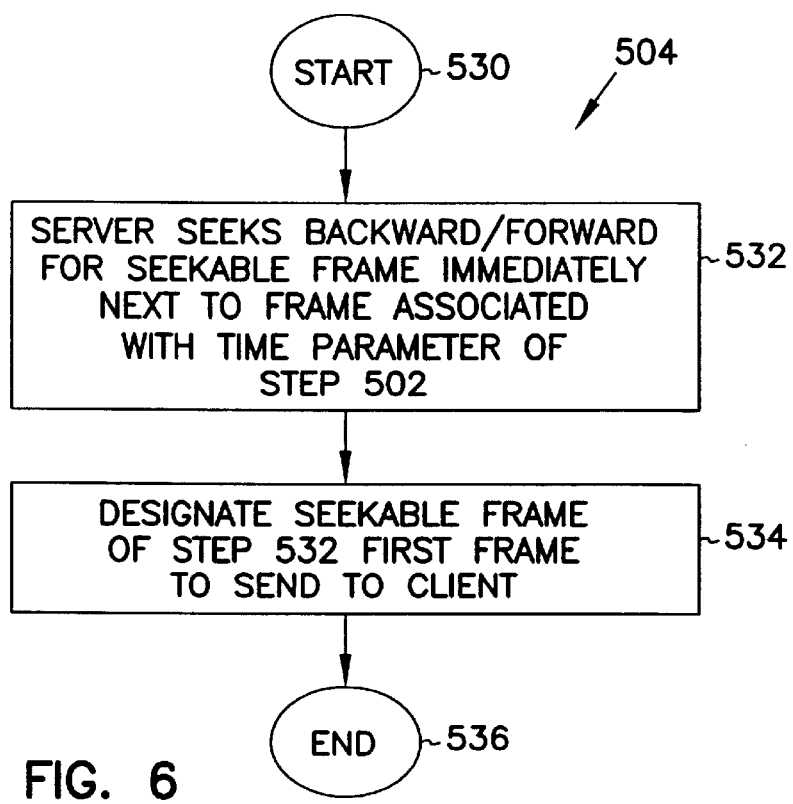
FIG. 6 illustrates the steps involved, in one embodiment of the present invention, to implement the step for ascertaining the first data packet for sending for the real-time play mode.

In step 504, the server ascertains the first data packet to send in order to satisfy the request of step 502. In the context of the play command, step 504 is implemented differently depending on whether the play mode is real-time or live. FIG. 6 illustrates the steps involved, in one embodiment of the present invention, to implement step 504 for the real-time play mode. Using the above real-time play mode example, the server seeks backward on the play stream, e.g., play stream 400 of FIG. 4, among the seekable frames to the seekable frame that is right before the specified time (in step 532). As mentioned in the above example, the specified time is 2 seconds. If the frame corresponding to 2 seconds is P frame 414, for example, the server seeks backward to I frame 410, i.e., the seekable I frame before P frame 414 (I frames, in addition to being playable and fast-forwardable, are also seekable). I frame 410 will need to be streamed to the client application since it contains the information necessary to decode P frame 414, which is the frame the user wants to start playing from. In this case, the first data packet streamed will be the data packet(s) representing I frame 410 (step 534). Alternatively, the server may seek forward on the play stream to the next seekable frame, which results in I frame 418 being the first video frame streamed out.

Figure 7:
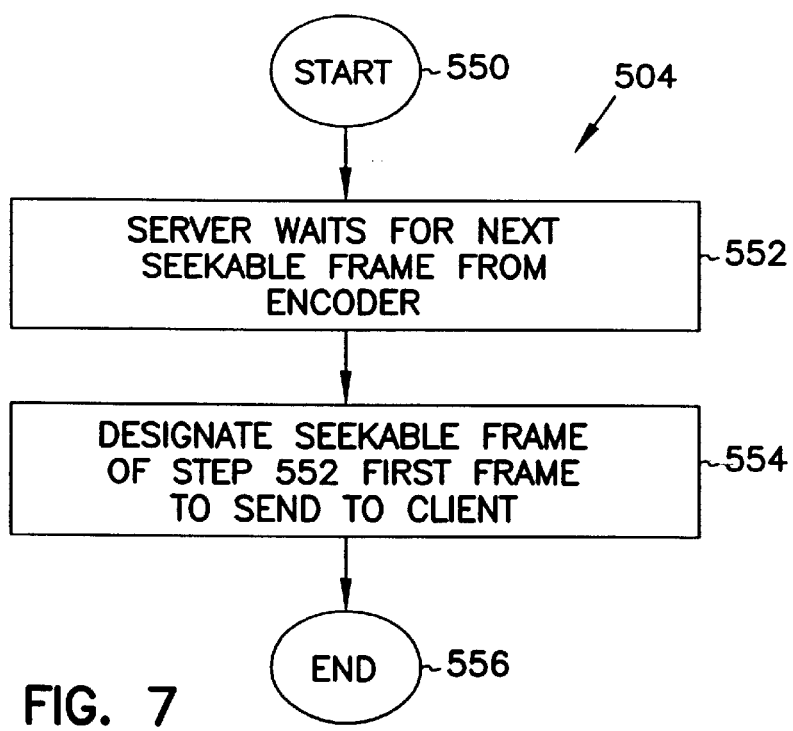
FIG. 7 illustrates the steps involved in implementing the step for ascertaining the first data packet for sending for the live play mode, in accordance with one embodiment of the present invention.

FIG. 7, on the other hand, illustrates the steps involved in one embodiment of the present invention in implementing step 504 for the live play mode. In the live play mode, the user wishes to watch from the currently encoded video frames. In this case, the server simply monitors the stream of encoded video frames as they are sent to the server from the encoder. The seekable video frame that arrives next at the server, i.e., the next I frame, is then the first video frame to be sent to the client application since the information in this I-frame may be used to decode itself and subsequent P frames to allow video rendering to take place in real-time (step 552). Accordingly, the first data packet streamed will be the data packet(s) representing this I frame (step 534).

Referring back now to FIG. 5, the server and the client computer may flush their buffers in step 506, e.g., server play-out buffer 112, retransmit buffer 118, and client play-out buffer 120 of FIG. 1. The buffers are flushed since they may already contain data packets that were transmitted and/or received prior to the issuance of the latest command by the user (via the client computer). In the context of the present example, the renderer application may be in the real-time play mode before the user issues a command to play live, and the buffers may already contain therein data packets pertaining to the pre-stored video frames and need to be flushed so that new video frames pertaining to the live video frames may be transmitted and received.

In step 508, the server communicates to the client the first valid packet sequence number of the series of packets to be rendered to satisfy the request of step 502. In step 510, the server streams data packets starting from the data packet ascertained in step 504. The first data packet typically includes the packet sequence number communicated earlier to the client computer in step 508. The client computer monitors the streams of data packets received and ignores all data packets whose sequence numbers may be smaller than the packet sequence number communicated in step 508. This is because some data packets associated with the earlier modes may have been in transit and may just now arrive at the client computer. Since the client computer knows in advance the sequence number of the first data packet it needs, the client computer may simply ignore these subsequently arriving data packets and waits for the proper data packets before rendering. Once the proper data packets arrive at the client computer, the client computer may begin to render them (step 512) starting from the data packet having the sequence number communicated earlier in step 508.

While playing in the pre-stored mode (or any other mode except live play), the user may fast forward to either a subsequent video frame in the pre-stored video file or to the current live video frame. As a side note, fast forward is not possible while the user is in the live play mode since the event to be recorded has yet to occur, much less to be digitized and encoded for transmission. The steps involved in the transition between, for example, real-time play and fast forward may be better understood with reference back to FIG. 5.

If the renderer application is currently in the real-time play mode, a command to fast forward by the user results in a fast forward command, along with a time parameter being sent from the client computer to the server computer (step 502). In one embodiment, the time parameter indicates to the server the time stamp of the most recently rendered video frame to enable to server to ascertain which video frame of the fast forward stream should be sent first in order to assure a smooth transition between play and fast forward. This is because typically only the client knows which video frame has been rendered last prior to the issuance of the fast forward command. The server computer may not have this knowledge since the server may have streamed other video frames which are still in transit or in the buffer and have not yet been rendered by the client computer.

In step 504, the server ascertains the first fast forwardable video frame to send to the client computer responsive to the command issued in step 502. In one embodiment, the play stream is employed for fast forwarding. In this embodiment, the first fast forwardable frame represents the I frame that is immediately prior in time to the video frame corresponding to the time parameter sent in step 502. Alternatively, the I frame that is immediately later in time to the video frame corresponding to the time parameter sent in step 502 may be employed as the first fast forwardable frame.

Figure 8:
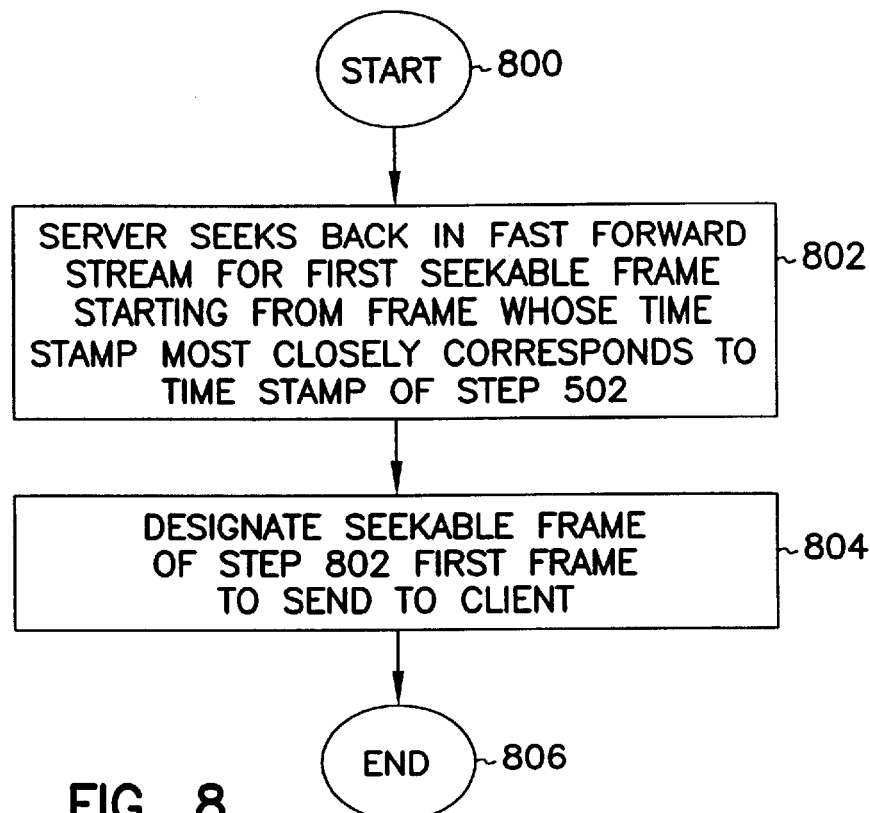
FIG. 8 illustrates the steps involved, in one embodiment of the present invention, to implement the step for ascertaining the first data packet for sending when transitioning from the real-time play mode (or other modes except live play) to the fast forward mode.

In a particularly advantageous embodiment, the fast forward stream is employed for fast forwarding. The steps taken by the server to ascertain the first data packet of the fast forward stream to send when transitioning from the real-time play mode (or other modes except live play) to the fast forward mode are depicted in FIG. 8. In step 802, the server seeks back in the fast forward stream from the video frame whose time corresponds or most closely corresponds to the time parameter sent from the client to the server in step 502 for the first frame to be sent. Alternatively, the server may seek forward in the fast forward stream from the video frame whose time corresponds or most closely corresponds to the time parameter sent from the client to the server in step 502 for the first frame to be sent. The fast forward stream, like the play stream, are stored in the server as the recording session progresses as video files.

To illustrate the steps involved in transitioning from the real-time play mode (or other modes except live play) to the fast forward mode when the fast forward stream is involved, consider the following example. Assume that the client is currently in the real-time play mode, and the last video frame rendered by the client computer is P frame 412 in play stream 400 of FIG. 4. Further assume that this P frame 412 has a time stamp of 6 seconds. In step 504, the server switches to the fast forward stream 450 and seeks backward from the video frame whose time corresponds or most closely corresponds to 6 seconds (step 802). Assume that P frame 456 in fast forward stream 450 has a time stamp that corresponds to or most closely corresponds to 6 seconds, the server will seek backward to the previous seekable frame, i.e., I frame 452 (in fast forward stream 450, all I frames are seekable and forwardable while all P frames are forwardable). Once I frame 452 is ascertained, the data packets representing the video frames of fast forward stream 450 are streamed to the client for rendering as a fast forward video clip (steps 506–514 of FIG. 5). It should be appreciated that in most cases, only one stream (either play or fast forward) is transmitted from the server to the client at any given time.

In the reverse situation, the user may also transition from the fast forward mode to the play mode. Assuming fast forward stream 450 is associated with an event still being recorded, the play mode entered depends on whether fast forwarding has reached the end of fast forward stream 450 (stored in the server) prior to transitioning to play (e.g., prior to the user pushing the play button or icon). If the end of the fast forward stream has not been reached while fast forwarding, the play mode entered will be the real-time play mode (i.e., playing previously recorded and stored video frames versus live video frames). This is the situation wherein the user presses the play button or icon while fast forwarding to begin playing from, for example, the video frame with a time stamp of 4 minutes when the live video frame has a time stamp of, for example, 6 minutes.

The steps involved in the transition between fast forward to real-time play may be better understood with reference back to FIG. 5. If the renderer application is currently in the fast forward mode, a command to play by the user results in a play command, along with a time parameter being sent from the client computer to the server computer (step 502). If the time parameter is earlier in time than the time stamp of the current live video frame, it is understood that the renderer application is transitioning to the real-time play mode. In one embodiment, the time parameter indicates to the server the time stamp of the most recently rendered video frame to enable to server to ascertain which video frame of the play stream 400 should be sent first in order to assure a smooth transition between fast forward and play. This is because only the client typically knows which video frame has been rendered last prior to the issuance of the play command (i.e., since the server may have streamed other video frames which are still in transit and have not yet arrived at the client computer).

Figure 9:
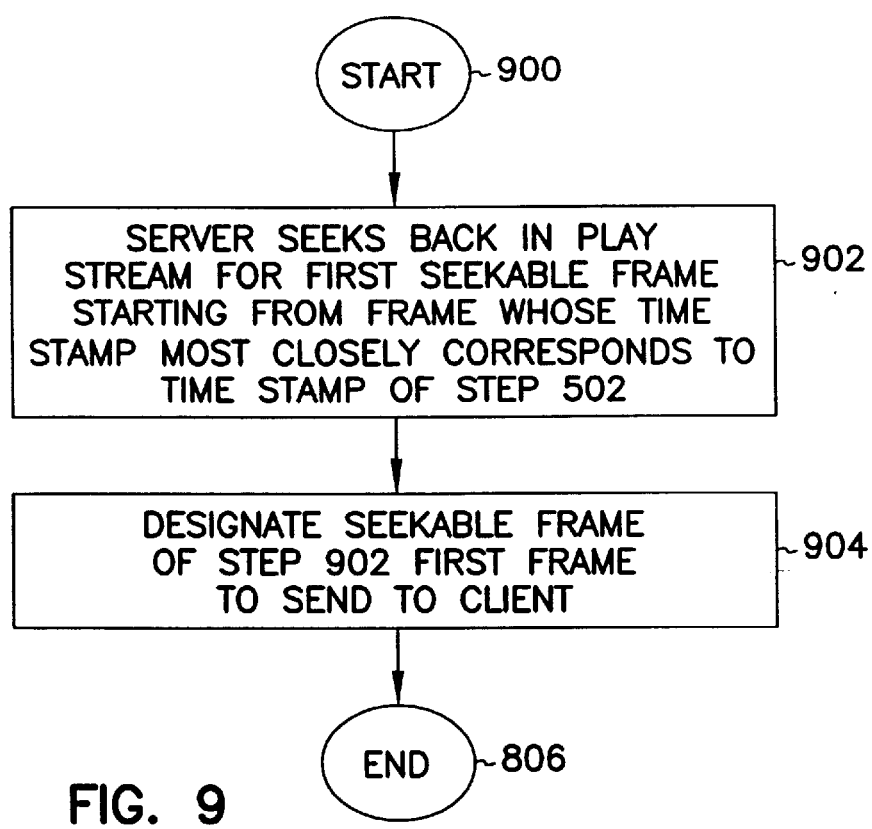
FIG. 9 illustrates the steps involved, in one embodiment of the present invention, to implement the step for ascertaining the first data packet for sending when transitioning from the fast forward mode to the real-time play mode.

In step 504, the server ascertains the first video frame to send to the client computer responsive to the command issued in step 502. In one embodiment, the server switches to the play stream and seeks back (or in the alternative forward) in the play stream from the video frame whose time corresponds or most closely corresponds to the time parameter sent from the client to the server in step 502 for the first seekable video frame. The steps taken by the server to ascertain the first data packet of the play stream to send when transitioning from the fast forward mode to the real-time play mode (step 504 of FIG. 5) are depicted, in accordance with an embodiment of the present invention, in FIG. 9.

To illustrate the foregoing, assume that the last video frame rendered by the client computer is P frame 458 in fast forward stream 450 of FIG. 4, and this P frame 458 has a time stamp of 36 seconds. In step 504, the server switches to the play stream 400 and seeks backward from the video frame whose time corresponds or most closely corresponds to 36 seconds (step 902). Assume that P frame 416 of play stream 400 has a time stamp that most closely corresponds to 36 seconds, the server will seek backward to the previous seekable frame in the play stream (step 904), i.e., I frame 410. Once I frame 410 is ascertained, the data packets representing the video frames of play stream 400 are streamed to the client for rendering as a real-time video clip (steps 506–514 of FIG. 5). If the server seeks forward in the alternative, I frame 418 represents the first video frame to be streamed to the client.

As mentioned earlier, it is not possible to transition from the live play mode to the fast forward mode. However, the user may transition from the fast forward mode to the live play mode (either directly by indicating the desire to the client computer or by fast forwarding to the end of the fast forward file in the server and running out of pre-stored fast forwardable frames). In one embodiment, the transition between the fast forward mode and the live play mode occurs automatically (i.e., without further intervention of the user and/or the client computer) as the end of the file of stored video frames is reached. The steps involved in the transition between fast forward to live play may be better understood with reference back to FIG. 5. If the renderer application is currently in the fast forward mode, a command to play live by the user results in a play command, along with a time parameter being sent from the client computer to the server computer (step 502). In one embodiment, the time parameter may represent a flag that simply indicates to the server that the client would like to play live video.

In step 504, the server ascertains in the play stream the first video frame to send to the client computer responsive to the command issued in step 502. In one embodiment, the server simply waits until the next seekable video frame of the play stream 400 is received. This seekable video frame (typically an I frame) and subsequent video frames from play stream 400 are then sent from the server to the client for displaying the live video.

While in the live play mode, the user may also enter the rewind mode, e.g., to perform an instant replay of a particularly interesting sequence or to go back and start displaying again from a previously rendered video frame. This is a particularly advantageous aspect of the invention since rewind is enabled, in accordance with one aspect of the present invention, in an efficient manner on a live video stream. In rewinding, the I frames of the play stream are transmitted to the client in reverse chronological order starting from the I frame immediately prior to the video frame whose time stamp is specified by the client.

The steps involved in the transition between live play (or any other mode) to rewind may be better understood with reference back to FIG. 5. If the renderer application is currently in the live play mode (or any other mode), a command to rewind by the user results in a rewind command, along with a time parameter being sent from the client computer to the server computer (step 502). In one embodiment, the time parameter indicates to the server the time stamp of the most recently rendered video frame to enable to server to ascertain which video frame of the play stream 400 should be sent in order to assure a smooth transition between play and rewind. This is because only the client typically knows which video frame has been rendered last prior to the issuance of the rewind command (i.e., since the server may have streamed other video frames which have not yet arrived at the client computer).

In step 504, the server ascertains the first video frame to send to the client computer responsive to the command issued in step 502. In one embodiment, the server seeks back in the play stream for the first seekable frame (I frame) from the video frame whose time corresponds or most closely corresponds to the time parameter sent from the client to the server in step 502. Alternatively, the server may seek forward in the play stream for the first seekable frame (I frame) from the video frame whose time corresponds or most closely corresponds to the time parameter sent from the client to the server in step 502. It should be appreciated that if the previous mode is fast forward, the server may switch from fast forward stream 450 to play stream 400 prior to ascertaining the first video frame to send to the client to accomplish rewind.

Once the appropriate I frame is ascertained, the server prepares the client for receiving the rewound video frames (steps 506 and 508 of FIG. 5). Thereafter, the server sends I frames of play stream 400 in reverse order (by repetitively seeking back for the previous seekable frame in play stream 400 and sending each to the client, for example). The sending of the I frames in reverse and displaying each at the client take place in steps 510 and 512 of FIG. 5. It should be apparent that the above discussion may also apply when transitioning from the real-time play mode to the rewind mode, or from any mode to the rewind mode, for that matter.

The transition from the rewind mode to the play mode or the fast forward mode follows the steps of FIG. 5, which have been discussed in detail herein. In general, the client sends a rewind command, along with a time parameter to indicate the last video frame that has been rendered by the client while rewinding (step 504). In the rewind case, the last video frame rendered represents one of the seekable frames (i.e., I frames) that were sent to the client in reverse order to facilitate rewinding. Thereafter the server streams data packets (either of the play stream or the fast forward stream depending on which mode the client transitions to) to the client (steps 504–512) starting from the first seekable frame closest to the frame whose time corresponds or most closely corresponds to the time stamp sent.

In accordance with one embodiment of the present invention, the client may enter the stop mode from any other mode. The transition to the stop mode involves sending the server a signal to terminate the current mode and reset the play stream to the first video frame of the video file (e.g., by sending it a time parameter of zero). The transition from the stop mode to any other mode essentially involves the steps of FIG. 5, the specifics of which depend on the mode being transitioned to. For example, the user may, via the client, fast forward, play beginning from a specific video frame (by first fast forwarding or seeking from the current start of file position), or the like.

In accordance with one embodiment of the present invention, the client may enter the pause mode from any other mode. Pause mode involves terminating display immediately at the client and requesting the server to stop sending new data packets. In one particularly advantageous embodiment, the client sends a signal to the server to set the outgoing bandwidth to zero, thereby terminating the transmission of data packets from the server to the client. Note that unlike the steps of FIG. 5, however, pause does not involve flushing the buffers. In other words, the data packets already sent, received, or are currently in transit through the network are kept and/or continued to be received in the client play-out buffer 120 at the client computer, thereby permitting the renderer application to immediately start rendering video frames from where it left off when the unpause mode is entered.

Upon entering the unpause mode, the client computer may send a signal to the server computer to reset the bandwidth to a nonzero value to permit data packets to be transmitted from where transmission was suspended (upon entering the pause mode). In this manner, the client computer may advantageously immediately begin to render video frames after unpausing using frames buffered at the client play-out buffer associated with the client computer. Note that no latency is suffered upon entering the unpause mode since video frames already exist in the client play-out buffer and were not flushed. Further, synchronization issues are substantially simplified since the server computer simply commences transmission of data packets from it left off when the outgoing bandwidth was reset to zero. Further, the inventive pause and unpause technique maximizes smoothness of the displayed video frames since no frames are missed upon unpausing (as would be the case if the buffers were flushed and the server must begin streaming from the closest seekable I frame).

In accordance with yet another aspect of the present invention, the data packets streamed from the server may be stored, i.e., recorded, at the client computer for subsequent display without having to be retransmitted from the server again. Responsive to a record button or icon, for example, the client computer may record video frames either while displaying the video frames (in either live play or real-time play modes) or by simply requesting the file of video frames to be streamed from the server without displaying the frames at the client computer. Some client applications may also be provided with mechanisms to prevent unauthorized recording or to keep track of recording for administrative, e.g., billing, purposes. It should be appreciated that mechanisms to inhibit unauthorized recording may also be provided at the server computer or even with the data packets themselves.

In another aspect of the present invention, the fast forward stream may be employed to facilitate low-bandwidth play (either live or real-time) when the network's available bandwidth is insufficient to support the transmission of the video frames in the play stream. As can be seen from FIG. 4 and the discussion herein, the fast forward stream encodes video data pertaining to a given video event using fewer frames than the number of frames required by the play stream. When the network's available bandwidth degrades, the fast forward stream may be sent by the server instead of the play stream. The renderer application may then display the frames of the fast forward stream at a slower frame rate than the frame rate normally employed on the fast forward stream's frames to allow the small number of frames of the fast forward stream to be displayed in the same amount of time that the more numerous frames of the play stream would have taken to display (had the play stream been transmitted). Although the resulting video may be more jerky, this aspect of the invention permits video streaming to continue even with very limited network bandwidth, which prevents the timely transmission of the frames in the play stream and would have resulted in termination of play otherwise.

While this invention has been described in terms of several preferred embodiments, there are alterations, permutations, and equivalents which fall within the scope of this invention. For example, although only a subset of all permutations of control mode transitions are discussed in detail herein for brevity's sake, it should be apparent to those skilled in the art given this disclosure that the transitions involving other modes may be practiced in accordance with the general technique disclosed herein. Further, although I frames and P frames are discussed throughout this disclosure, it should be borne in mind that the invention applies for any encoding schemes wherein the video data is encoded as a series of independent and dependent video frames. As a further example, although the client-server computer architecture is employed herein to facilitate ease of discussion, the term "client" denotes any type of computer capable of receiving data from another computer. Likewise, the term "server" denotes any type of computer capable of streaming data to another computer. The above is true irrespective whether the computers are coupled together using what is popularly known as "client-server" architectures. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A computer-readable medium comprising computer-program instructions for transmitting streamed digital video data computer-program instructions being executable by a processor for:

inputting a first plurality of data packets into a server play-out buffer, the first plurality of data packets containing video frames representing the streamed digital video data, an output of the server play-out buffer being configured to be coupled to a network data connection for transmitting the first plurality of data packets to a client computer;

communicating at least a subset of the first plurality of the data packets from the server play-out buffer to a remission buffer having an output coupled to the network data connection;

outputting the first plurality of data packets from the server play-out buffer onto the network data connection for transmitting the first plurality of data packets to the client computer via the network data connection; and responsive to receiving a request from the client computer for retransmission of one or more data packets of the at least a subset of the first plurality of the data packets, outputting at least one data packet from the retransmission buffer to the network data connection for communication to the client computer.

2. The computer-readable medium of claim 1 further comprising:

responsive to receiving a retransmission request from the client computer, outputting a selected data packet from the retransmission buffer to the network data connection to a retransmission request from said the client computer, said, the selected data packet representing a data packet from the first plurality of data packets that was not satisfactorily received by the client computer.

3. The computer-readable medium of claim 2 further comprising responsive to receiving, by the retransmission buffer, the at least a subset of the first plurality of data packets, discarding any previously buffered data packets from the retransmission buffer.

4. The computer-readable medium of claim 3, wherein the method further comprises sizing the retransmission buffer such that a given data packet remains in the retransmission buffer for a predefined period of time before being discarded, the predefined time period being longer than an average acceptable latency period, the average acceptable latency period being a function of an elapsed amount of time between data packet transmission from a server computer to the client computer to rendering of the data packet by the client computer.

5. The computer-readable medium of claim 1 wherein the video frames represent playable video frames of the streamed digital video data, the playable frames representing frames configured to be displayed while a renderer application associated with the client computer is in play mode.

6. The computer-readable medium of claim 5 wherein the streamed digital video data represents live video and the play mode represents live play mode.

7. The computer-readable medium of claim 5 wherein the streamed digital video data represents real-time video and the play mode represents real-time video mode.

8. The computer-readable medium of claim 1 wherein the streamed digital video data represents a fast forward stream of video frames, the fast forward stream of video frames represents a first stream of video frames encoded differently from a second stream of video frames, the first stream of video frames being configured for normal play by a renderer application associated with the client computer, both the first stream and the second stream pertain to a recorded event, the first stream of video frames, when streamed to the client computer, permits the user to view the recorded event at a faster pace than a pace afforded by the second stream.

9. A server for transmitting streamed digital video data to a client computer, the server being coupled over a network to the client computer, the server comprising:

a processor; and a memory coupled to the processor, the memory comprising computer-program instructions executable by a processor for:

inputting a first plurality of data packets into a server play-out buffer, the first plurality of data packets containing video frames representing the streamed digital video data, an output of the server play-out buffer being configured to be coupled to a network data connection for transmitting the first plurality of data packets to a client computer;

communicating at least a subset of the first plurality of the data packets from the server play-out buffer to a retransmission buffer having an output coupled to the network data connection;

outputting the first plurality of data packets from the server play-out buffer onto the network data connection for transmitting the first plurality of data packets to the client computer via the network data connection; and responsive to receiving a request from the client computer for retransmission of the at least a subset of the first plurality of the data packets, outputting at least one data packet from the retransmission buffer to the network data connection, the at least one data packet comprising a selected data packet corresponding to a data packet from the first plurality of data packets that was not satisfactorily received by the client computer.

10. The server of claim 9, wherein the computer-program instructions further comprise instructions for:

responsive to receiving, by the retransmission buffer, the at least a subset of the first plurality of data packets, discarding any previously buffered data packets from the retransmission buffer.

11. The server of claim 10, wherein the computer-program instructions further comprise instructions for sizing the retransmission buffer such that a given data packet remains in the retransmission buffer for a predefined period of time before being discarded, the predefined time period being longer than an average acceptable latency period, the average acceptable latency period being a function of an elapsed amount of time between data packet transmission from a server computer to the client computer to rendering of the data packet by the client computer.

12. The server of claim 9, wherein the video frames represent playable video frames of the streamed digital video data, the playable frames representing frames configured to be displayed while a renderer application associated with the client computer is in play mode.

13. The server of claim 12, wherein the streamed digital video data represents live video and the play mode represents live play mode.

14. The computer-readable medium of claim 12, wherein the streamed digital video data represents real-time video and the play mode represents real-time video mode.

15. The server of claim 9, wherein the streamed digital video data represents a fast forward stream of video frames, the fast forward stream of video frames represents a first stream of video frames encoded differently from a second stream of video frames, the first stream of video frames being configured for normal play by a renderer application associated with the client computer, both the first stream and the second stream pertain to a recorded event, the first stream of video frames, when streamed to the client computer, permits the user to view the recorded event at a faster pace than a pace afforded by the second stream.

16. A computer-readable medium for implementing a streaming video display system, the computer-readable medium comprising computer-program instructions executable by a processor for:
   communicating a first plurality of video frames to a client computer, the first plurality of video frames representing a subset of a stream of video frames, the stream of video frames comprising independent playable video frames and dependent playable video frames;
   receiving a rewind command and a time parameter from the client computer, the time parameter representing a time stamp associated with the video frame rendered by the client computer immediately before issuance of the rewind command; and
   responsive to receiving the rewind command, streaming a second plurality of video frames of the stream different from the first plurality of video frames to the client computer, the second plurality of video frames consisting of at least a subset of the independent playable video frames arranged in reverse chronological order.

17. The computer-readable medium of claim 16, wherein the second plurality of video frames represents rewound independent playable video frames that are prior in time to a video frame rendered immediately before issuing the rewind command and that are sent in reverse chronological order to the client computer.

18. The computer-readable medium of claim 17, wherein the computer-program instructions further comprise instructions for responsive to receiving the time parameter, ascertaining which video frame of multiple video frames in a digital video data file was rendered before issuance of the rewind command, the digital video file representing a copy of the live streamed digital video data.

19. The computer-readable medium of claim 18, wherein the computer-program instructions further comprise instructions for ascertaining a first independent playable video frame of the rewound independent playable video frames by seeking backward in the digital video data file from the video frame rendered immediately before issuing the rewind command for an immediately prior in time independent playable video frame.

20. The computer-readable medium of claim 18, further comprising ascertaining a first independent playable video frame of the rewound independent playable video frames by seeking forward in the digital video data file from the video frame rendered immediately before issuing the rewind command for an immediately later in time independent playable video frame.

21. The computer-readable medium of claim 16, wherein the computer-program instructions further comprise instructions for, in response to a real-time play command issued from the client computer after the rewind command, streaming a third plurality of video frames from the server computer to the client computer for display on the video display terminal, the third plurality of video frames representing video frames that are later in time to a last displayed video frame of the second plurality of the video frames prior to issuing the real-time play command.

22. The computer-readable medium of claim 21, wherein the computer-program instructions further comprise instructions for:
   issuing a time parameter associated with the last displayed video frame of the second plurality of the video frames; and
   using the time parameter to ascertain the last displayed video frame of the second plurality of the video frames in a digital video data file representing a copy of the live streamed digital video data.

23. The computer-readable medium of claim 22, wherein the computer-program instructions further comprise instructions for ascertaining a first video frame of the third plurality of the video frames by seeking backward in the digital video data file from the last displayed video frame for an immediately prior in time independent playable video frame.

24. The computer-readable medium of claim 22, wherein the computer-program instructions further comprise instructions for ascertaining a first video frame of the third plurality of the video frames by seeking forward in the digital video data file from the last displayed video frame for an immediately later in time independent playable video frame.

25. A server for streaming video, the server comprising:
   a processor; and
   a memory coupled to the processor, the memory comprising computer-program instructions executable by a processor for:
      communicating a first plurality of video frames to client computer, the first plurality of video frames representing a subset of a stream of video frames, the stream of video frames comprising independent playable video frames and dependent playable video frames;
      receiving a rewind command and a time parameter from the client computer, the time parameter representing a time stamp associated with the video frame rendered by the client computer immediately before issuance of the rewind command; and
      responsive to receiving the rewind command, streaming a second plurality of video frames of the stream different from the first plurality of video frames to the client computer, the second plurality of video frames consisting of at least a subset of the independent playable video frames arranged in reverse chronological order, the subset being prior in time to the video frame rendered by the client computer immediately before issuance of the rewind command.

26. The server of claim 25, wherein the computer-program instructions further comprise instructions for:
responsive to receiving the time parameter, identifying the video frame in a digital video data file as a function of the time stamp, the digital video file representing a copy of the live streamed digital video data.

27. The server of claim 26, wherein the computer-program instructions further comprise instructions for ascertaining a first independent playable video frame of the rewound independent playable video frames by seeking backward in the digital video data file from the video frame rendered immediately before issuing the rewind command for an immediately prior in time independent playable video frame.

28. The server of claim 26, further comprising ascertaining a first independent playable video frame of the rewound independent playable video frames by seeking forward in the digital video data file from the video frame for an immediately later in time independent playable video frame.

29. The server of claim 25, wherein the computer-program instructions further comprise instructions for, in response to a real-time play command issued from the client computer after the rewind command, streaming a third plurality of video frames to the client computer, the third plurality of video frames representing video frames that are later in time to a last client computer displayed video frame of the second plurality of the video frames prior to issuance of the real-time play command.

30. The server of claim 29, wherein the computer-program instructions further comprise instructions for:
issuing a time parameter associated with the last displayed video frame of the second plurality of the video frames; and
using the time parameter to ascertain the last displayed video frame of the second plurality of the video frames in a digital video data file representing a copy of the live streamed digital video data.

31. The server of claim 30, wherein the computer-program instructions further comprise instructions for ascertaining a first video frame of the third plurality of the video frames by seeking backward in the digital video data file from the last displayed video frame for an immediately prior in time independent playable video frame.

32. The server of claim 30, wherein the computer-program instructions further comprise instructions for ascertaining a first video frame of the third plurality of the video frames by seeking forward in the digital video data file from the last displayed video frame for an immediately later in time independent playable video frame.

33. A method for implementing control features in a streamed video display system, the streamed video system comprising a server coupled over a network to a client computer, the method comprising:
receiving a control command and a time parameter from the client computer, the control command indicating that the client computer is transitioning from a first control mode to a second control mode;
responsive to receiving the control command:
ascertaining a first independent video frame of a stream of video frames to transmit to the client computer, the first independent video frame being ascertained as a function of the time parameter;
transmitting a packet sequence number associated with the first independent video frame to the client computer;
streaming a first plurality of video frames of the stream of video frames starting from the first independent video frame to the client computer; and
communicating at least a subset of the first plurality of video frames to a retransmission buffer for retransmission to the client computer in response to receipt of a request for retransmission from the client computer.

34. The method of claim 33 wherein the first control mode is a stop mode and the second control mode is a real-time play mode in which the client computer displays video frames starting from a time specified by the time parameter.

35. The method of claim 33 wherein the first control mode is a stop mode and the second control mode is a live play mode in which the client computer displays live video frames as they are received from an encoder coupled to the server.

36. The method of claim 33 wherein the first control mode is a live play mode and the second control mode is a rewind mode, the live play mode representing a mode wherein the client computer displays live video frames as they are received from an encoder coupled to the server computer, the rewind mode representing a mode wherein the client computer displays independent video frames in reverse chronological order starting from an independent video frame whose time stamp most closely corresponds to the time parameter.

37. The method of claim 33 wherein the first control mode is a real-time play mode and the second control mode is a fast forward mode, the real-time play mode representing a mode wherein the client computer displays pre-stored video frames, the fast forward mode representing a mode wherein the client computer displays fast forwardable video frames starting from an independent video frame whose time stamp most closely corresponds to the time parameter, the fast forwardable video frames being configured to permit a recorded event to be displayed at a faster pace than a pace of the real-time play mode.

38. The method of claim 37 wherein the fast forwardable video frames represent video frames of a fast forward stream of video frames, the fast forward stream of video frames representing a stream of video frames different from a play stream of video frames for the real-time play mode, the fast forward stream and the play stream being encoded from a single recorded event.

39. The method of claim 33 wherein the first control mode is a live play mode and the second mode is a pause mode, the live play mode representing a mode wherein the client computer displays live video frames as they are received from the server computer, the pause mode representing a mode wherein the stream of video frames is transmitted to the client computer at a bandwidth of zero.

40. The method of claim 33 wherein the first control mode is a fast forward mode and the second mode is a live play mode, the live play mode representing a mode wherein the client computer displays live video frames as they are received from an encoder coupled to the server computer, the fast forward mode representing a mode wherein the client computer displays fast forwardable video frames of a stored video stream starting from an independent video frame whose time stamp most closely corresponds to the time parameter, the fast forwardable video frames being configured to permit a recorded event to be displayed at a faster pace than a pace of the live play mode, the first control mode being transitioned to the second control mode automatically without intervention from an user of the client computer upon reaching an end of the stored video stream.

41. A computer-readable medium for implementing control features in a streamed video display system, the computer-readable medium comprising computer-program instructions executable by a processor for:
receiving a control command and a time parameter from a client computer, the control command indicating that the client computer is transitioning from a first control mode to a second control mode;

responsive to receiving the control command:
  ascertaining a first independent video frame of a stream of video frames to transmit to the client computer, the first independent video frame being ascertained as a function of the time parameter;
  streaming a first plurality of video frames of the stream of video frames starting from the first independent video frame to the client computer;
  communicating at least a subset of the first plurality of video frames to a retransmission buffer for retransmission to the client computer in response to receipt of a request for retransmission from the client computer; and
  wherein the first control mode and second control modes are respectively selected from a stop mode and a real-time play mode, a stop mode and a live play mode, a live play mode and a rewind mode, a real-time play mode and a fast forward mode, a live play mode and a pause mode, or a fast forward mode and a live play mode.

42. A server for implementing control features in a streamed video display system, the server comprising a processor; and a memory coupled to the processor, the memory comprising computer-program instructions as recited in claim 41.

43. A method for implementing control features in a streamed video display system, the method comprising:
  communicating a control command and a time parameter to a server, the control command indicating that a client computer is transitioning from a first control mode to a second control mode, the time parameter indicating a time stamp of a video frame previously rendered by the client;
  responsive to communicating the control command, receiving a first plurality of video frames of a stream of video frames and a packet sequence number from the server, the first plurality of video frames comprising a first independent video frame of the stream of video frames, the first independent video frame being based on the time parameter, the packet sequence number corresponding to the first independent video frame; and
  wherein the first control mode and second control modes are respectively selected from a stop mode and a real-time play mode, a stop mode and a live play mode, a live play mode and a rewind mode, a real-time play mode and a fast forward mode, a live play mode and a pause mode, or a fast forward mode and a live play mode.

44. The method of claim 43, wherein the method further comprises:
  determining that a data packet of the first plurality of data has not been properly received;
  communicating a request for retransmission of the data packet to the server; and
  responsive to communicating the request, receiving a retransmission of the data packet from the server, the retransmission originating from a server retransmission buffer.

45. A computer-readable medium for implementing control features in a streamed video display system, the computer-readable medium comprising computer-program instructions executable by a processor for:
  communicating a control command and a time parameter to a server, the control command indicating that the client computer is transitioning from a first control mode to a second control mode, the time parameter indicating a time stamp of a video frame previously rendered by the client;
  responsive to communicating the control command, receiving a first plurality of video frames of a stream of video frames and a packet sequence number from the server, the first plurality of video frames comprising a first independent video frame of the stream of video frames, the first independent video frame being based on the time parameter, the packet sequence number corresponding to the first independent video frame; and
  wherein the first control mode and second control modes are respectively selected from a stop mode and a real-time play mode, a stop mode and a live play mode, a live play mode and a rewind mode, a real-time play mode and a fast forward mode, a live play mode and a pause mode, or a fast forward mode and a live play mode.

46. The computer-readable medium of claim 45, wherein the computer-program instructions further comprise instructions for:
  determining that a data packet of the first plurality of data has not been properly received;
  communicating a request for retransmission of the data packet to the server; and
  responsive to communicating the request, receiving a retransmission of the data packet from the server, the retransmission originating from a server retransmission buffer.

47. A client computer for implementing control features in a streamed video display system, the client computer comprising:
  a processor; and
  a memory coupled to the processor, the memory comprising computer-program program instructions executable by the processor for:
    communicating a control command and a time parameter to a server, the control command indicating that the client computer is transitioning from a first control mode to a second control mode, the time parameter indicating a time stamp of a video frame previously rendered by the client;
    responsive to communicating the control command, receiving a first plurality of video frames of a stream of video frames and a packet sequence number from the server, the first plurality of video frames comprising a first independent video frame of the stream of video frames, the first independent video frame being based on the time parameter, the packet sequence number corresponding to the first independent video frame; and
    wherein the first control mode and second control modes are respectively selected from a stop mode and a real-time play mode, a stop mode and a live play mode, a live play mode and a rewind mode, a real-time play mode and a fast forward mode, a live play mode and a pause mode, or a fast forward mode and a live play mode.

48. The client computer of claim 47, wherein the computer-program instructions further comprise instructions for:
  determining that a data packet of the first plurality of data has not been properly received;
  communicating a request for retransmission of the data packet to the server; and
  responsive to communicating the request, receiving a retransmission of the data packet from the server, the retransmission originating from a server retransmission buffer.

* * * * *